United States Patent
Douilly et al.

(10) Patent No.: US 10,562,246 B2
(45) Date of Patent: Feb. 18, 2020

(54) DEVICE AND METHOD FOR CORRECTION OF GEOMETRICAL DIFFERENCES OF THE SURFACES OF PARTS TO BE ASSEMBLED AT THE ASSEMBLY INTERFACE

(71) Applicant: AIRBUS GROUP SAS, Blagnac (FR)

(72) Inventors: Marc Douilly, Albert (FR); Patrice Rabate, Saint Herblain (FR); Hugo Falgarone, Paris (FR)

(73) Assignee: AIRBUS, Blagnac (FR)

( * ) Notice: Subject to any disclaimer, the term of this patent is extended or adjusted under 35 U.S.C. 154(b) by 319 days.

(21) Appl. No.: 15/387,655

(22) Filed: Dec. 22, 2016

(65) Prior Publication Data

US 2017/0190124 A1 Jul. 6, 2017

(30) Foreign Application Priority Data

Dec. 30, 2015 (FR) ...................... 15 63462

(51) Int. Cl.
| | | |
|---|---|---|
| *B29C 70/74* | (2006.01) | |
| *B33Y 50/02* | (2015.01) | |
| *B33Y 10/00* | (2015.01) | |
| *B33Y 30/00* | (2015.01) | |
| *B29C 64/00* | (2017.01) | |
| *B29C 70/84* | (2006.01) | |
| *B29K 105/20* | (2006.01) | |

(52) U.S. Cl.
CPC ............ *B29C 70/745* (2013.01); *B29C 70/84* (2013.01); *B33Y 10/00* (2014.12); *B33Y 30/00* (2014.12); *B33Y 50/02* (2014.12); *B29K 2105/20* (2013.01)

(58) Field of Classification Search
CPC . B29C 70/745; B29C 70/84; G05B 19/41805; G05B 19/4099; G05B 2219/35062; G05B 2219/37205; G05B 2219/40613; B64F 5/10; B33Y 50/02; B33Y 10/00; B33Y 30/00; Y02P 90/04; Y02P 80/40; Y02P 90/26; B29K 2105/20
See application file for complete search history.

(56) References Cited

U.S. PATENT DOCUMENTS

| | | |
|---|---|---|
| 6,618,505 B2 | 9/2003 | Cork et al. |
| 2008/0205763 A1 | 8/2008 | Marsh et al. |
| 2015/0367579 A1 | 12/2015 | Laudrain |

FOREIGN PATENT DOCUMENTS

| | | |
|---|---|---|
| FR | 3 022 527 A1 | 12/2015 |
| WO | 2009/044362 A2 | 4/2009 |

*Primary Examiner* — Robert J Grun
(74) *Attorney, Agent, or Firm* — Im IP Law; Chai Im; C. Andrew Im

(57) ABSTRACT

A device to correct geometrical differences of surfaces of parts to be assembled at the interface of the assembly. A measurer to acquire data by measuring the geometry of the assembly surfaces of two parts to be assembled to each other with their respective assembly surfaces facing. A simulator configured to simulate the assembly of the parts and to determine from the acquired data at each measured point of a sampling of the interface a thickness of the void resulting from the geometrical discrepancies between the assembly surfaces. An additive fabricator to receive from the simulator data representative of the thicknesses of the voids resulting from the geometrical discrepancies between the assembly surfaces. The additive fabricator configured to deposit material on the assembly surface of at least one of the parts to at least partly fill the void resulting from the geometrical discrepancies between the assembly surfaces.

4 Claims, 2 Drawing Sheets

DEVICE AND METHOD FOR CORRECTION OF GEOMETRICAL DIFFERENCES OF THE SURFACES OF PARTS TO BE ASSEMBLED AT THE ASSEMBLY INTERFACE

RELATED APPLICATIONS

This application claims priority from French Patent Application No. 15 63462 filed Dec. 30, 2015, which is incorporated herein by reference in its entirety.

FIELD OF THE INVENTION

The present invention lies in the field of the assembly of parts intended to produce a mechanical structure and more particularly concerns a device and a method for correcting geometrical differences of the surfaces of parts to be assembled at the interface of the assembly.

BACKGROUND OF THE INVENTION

The imperfections of the methods of fabricating parts lead to dispersion in terms of the shapes and dimensions of the geometrical envelope of the parts produced and therefore discrepancies between the geometry of their nominal surfaces, i.e. the geometry of their intended theoretical surfaces, and the geometry of their real surfaces obtained after fabrication.

Complex mechanical structures are often produced by assembling a plurality of parts held together by mechanical connections, which assembly operations are generally carried out at one or more assembly stations.

Because of the differences between the geometry of the nominal surfaces and the geometry of the real surfaces of the parts, these assembly stations necessitate means for modification and geometrical adjustment of the shapes of the parts that have to be assembled, such as inserting shims, filling with mastic or reworking.

The production of a mechanical connection termed "complete", i.e. with no degree of freedom, between two parts imposes the surfaces of the two parts that are face-to-face in the assembly bearing one on the other in as perfect a manner as possible, i.e. so as to minimize the residual clearance at the interface of these surfaces and the stresses introduced by deformations of the parts during assembly. This assumes that the two surfaces are geometrically complementary at their interface. By "interface" is meant the area of junction of the parts, corresponding to the respective facing surfaces of those parts to be assembled.

According to a first known method, the discrepancy at the interface is eliminated by the local deformation of one or both parts caused by the forces introduced during the production of the connection. The deformation, which may more particularly affect the less rigid part, is accompanied by modifications of the mechanical stress state of the parts.

This modification of the stress state must be limited so as not to affect, in particular, the mechanical strength of the parts and therefore of the mechanical structure. Moreover, in the case of rigid parts, it is not always possible to guarantee the deformation of the part to ensure the intimate contact of the assembled parts.

According to another method, a polymerizable filler mastic is deposited at the interface of the two parts and when the parts are pre-assembled flows into the areas in which contact between the parts is not achieved and thus fills the voids that would be formed in the absence of mastic.

However, the use of mastics of this kind is irksome and is not always possible, depending on the forces that have to be transmitted in the joint and the assembly elements used. Moreover, mastics having appropriate structural properties are dense and this can result in an increase in the weight of the assembled structure, which is all the more problematic in that it is not controlled.

It is therefore desirable to control the geometry of the surfaces at the interface of the parts to ensure an acceptable level of deformation and therefore of modification of the stress state.

This acceptable level of deformation is defined when designing the structure by assembly specifications and may be expressed by specified limits on the permissible maximum geometrical discrepancies of the surfaces at the interface of the parts to be assembled.

In order to limit these discrepancies at the interface of the surfaces of two parts to be assembled, it is known to measure the differences between the real and nominal surface geometries of a first part in order to determine the geometry of a nominal surface of a second part to be fabricated or in order to correct the geometry of a nominal surface of a second part that has already been fabricated. This is so that the differences between the geometries of the nominal and real surfaces of the first part are compensated by the geometry of the nominal surface of the second part. The geometry of the nominal surface of the second part is therefore determined so that it is complementary to the geometry of the real surface of the first part.

The differences between the geometry of the real and nominal surfaces are generally determined by measuring the surface of the first part, for example using a three-dimensional measuring machine. Moreover, the fabrication of the second part or the correction of the geometry of its nominal surface is typically effected by removing material, i.e. by machining.

The operations of fabrication of a part or of correction of the geometry of its nominal surface are relatively complex to implement if that part is a thin part, for example a metal sheet, in that the removal of material can significantly reduce the mechanical strength of the part. Moreover, the correction operations may be impossible to carry out without affecting the integrity of the part if the thickness of the part becomes less than a minimum necessary for the transmission of the designed forces in the part.

Moreover, these operations necessitate supplementary manipulations of the parts to be assembled and therefore a significant loss of time on the production or assembly line.

SUMMARY OF THE INVENTION

An objective of the present invention is to propose a device and a method for correcting geometrical differences of the surfaces of two parts to be assembled at the interface of the assembly in which the introduction of unwanted stresses into the parts to be assembled is limited if not prevented.

Another objective of the present invention is to enable at least partial integration into an automated production or assembly line.

Another objective of the present invention is to avoid the necessity for supplementary manipulation of the parts to be assembled.

Another objective of the present invention is to be useable for any mechanical structure assembly with varied shapes or materials of the assembled parts.

To this end, according to a first aspect, the present invention is directed to a device for correction of geometrical differences of surfaces of parts to be assembled at the interface of the assembly, comprising:

acquisition means by measurement of the geometry of assembly surfaces of two parts intended to be assembled to each other with their respective assembly surfaces facing, simulation means receiving from said acquisition means data representative of the geometry of the assembly surfaces, configured to simulate the assembly of the parts and to determine from said data at each measured point of a sampling of the interface a thickness of the void resulting from the geometrical discrepancies between said assembly surfaces, additive fabrication means receiving from the simulation means data representative of the thicknesses of the voids resulting from the geometrical discrepancies between said assembly surfaces and configured to deposit material on the assembly surface of at least one of the parts so as at least partly to fill the void resulting from said geometrical discrepancies between said assembly surfaces.

Thanks to these features of the device, correction of the geometrical discrepancies of the surfaces to be assembled is achieved without degrading the mechanical strength of the parts to be assembled, in that only added material is deposited on the assembly surface of at least one of the parts to be assembled. This material does not affect the integrity of the parts to be assembled, whatever their shape or the material from which they are made. The mechanical strength of the parts is therefore controlled.

Moreover, the measuring means, the simulation means and the fabrication means being adapted to respond to instructions delivered by digital data media, the correction device can be entirely automated.

The data representative of the measured geometry of each assembly surface is materialized by sampling each of the surfaces of the interface.

In particular embodiments, the invention also has the following features, separately or in any technically operative combination.

In particular embodiments of the invention, the additive fabrication means comprise a device for depositing material fastened to a bearer structure adapted to move said device.

Thanks to this feature, the deposition device can be disposed facing the assembly surface on which the material must be deposited whatever the shape of said surface, provided that said surface is accessible.

In particular embodiments, the device for depositing material comprises a head for depositing material fastened to a support structure mounted on the bearer structure and adapted to move said head relative to said bearer structure.

Thanks to this feature, the deposition head may be disposed facing the assembly surface onto which material must be deposited precisely and faster by avoiding continuous movement of the bearer structure.

In particular embodiments, the device for depositing material comprises means for controlling the head adapted to control the head relative to one of the parts as a function of the data representative of the thicknesses of the voids resulting from the geometrical discrepancies between said assembly surfaces.

The head is therefore adapted to be steered along a predefined deposition trajectory.

According to another aspect, the invention is directed to a method of correcting geometrical differences of surfaces of parts to be assembled at the interface of the assembly comprising:

a step of measuring the geometry of an assembly surface of each part to be assembled, a step of simulation of the assembly of the parts on the basis of data representative of the measured geometry of the assembly surfaces during which geometrical discrepancies are determined by calculation for a sampling of points between the assembly surfaces at the interface of the two parts, from which geometrical discrepancies are determined characteristics of voids remaining between the assembly surfaces of the parts, before the assembly of the parts, a step of depositing material on an assembly surface of at least one of the two parts so as at least partly to fill the voids between said surfaces resulting from the geometrical discrepancies when the parts are assembled.

None of said parts necessitates manipulation between the steps of measuring the geometry of the assembly surface of each part to be assembled and the step of depositing material on the assembly surface of one of the parts.

In particular embodiments, the step of simulation of the assembly of the parts comprises a step of simulation of positioning the parts on the basis of the data representative of the measured geometry of the assembly surfaces, said data comprising data corresponding to the measured geometry of at least one known and identifiable singular point of the structure of each assembly surface making it possible to define the position of simulated assembly surfaces relative to one another. By singular point of the structure is meant a point, either pre-existing or created for this purpose, of the identifiable structure of a part, for example a hole, an edge, an apex, a marking, a target, etc.

This step makes it possible to conform to the positions that the parts must have in the assembly by taking into account specified relative positions of the singular points of the parts.

In particular embodiments, the step of simulation of the assembly of the parts comprises a step of simulation of the contact of the parts on the basis of the data representative of the geometry of the assembly surfaces, in which contact is simulated between the simulated assembly surfaces by causing them to bear on one another, where appropriate under a specified stress taking into account the deformations of each of the parts and without interpenetration of the parts.

This step makes it possible to simulate assembly in a manner that is more representative of reality, in the sense that the shapes and positions of the simulated assembly surfaces relative to one another after bringing them into contact in this way is representative of the position of the assembly surfaces of the parts relative to one another following their assembly.

In particular embodiments, the step of simulation of the assembly of the parts takes account of the deformations of said parts by predetermined forces introduced during assembly, in particular when assembly is effected by fasteners with a clamping action.

In particular embodiments, during the assembly simulation step, the void resulting from the geometrical discrepancies between the assembly surfaces of the parts is discretized into a predetermined number of layers of material to be deposited.

Thus a strategy for filling these voids can be established and integrated into a digital file. That strategy may consist in the determination of the trajectory of a device for depositing material.

DESCRIPTION OF THE FIGURES

The invention will be better understood after reading the following description, which is given by way of nonlimiting example and with reference to the figures, which show.

DETAILED DESCRIPTION OF THE INVENTION

The present invention relates to a device for correction of geometrical differences of the surfaces of two parts that are brought into contact during assembly of said two parts. These surfaces that are brought into contact, termed "assembly surfaces" in the present description, are intended to be disposed facing one another when assembling the parts.

The description and the drawings refer to the surfaces of the parts in contact. Although only said surfaces are represented, it must be understood that the parts can be any shape and that the invention can be applied, for example, to thin parts such as cladding panels or to profiled elements or to thick parts of any shape, with no particular limitations as to dimensions and materials other than may be imposed by the means employed.

The correction device comprises acquisition means 10 by measurement of the geometry of the surfaces of at least two parts to be assembled in an area of each of the parts the surface of which must be brought into contact with that of another part by the assembly process. In the description the corresponding result of these measurements is designated by the expression "measured geometry" of the corresponding surface.

The measured geometry of a surface is that of a part as obtained following its fabrication and ready to be assembled with a specified resolution and a specified accuracy that depend on the accuracy required for the corrections to be made by the device. The acquisition means 10 are preferably automated.

Figure 1:
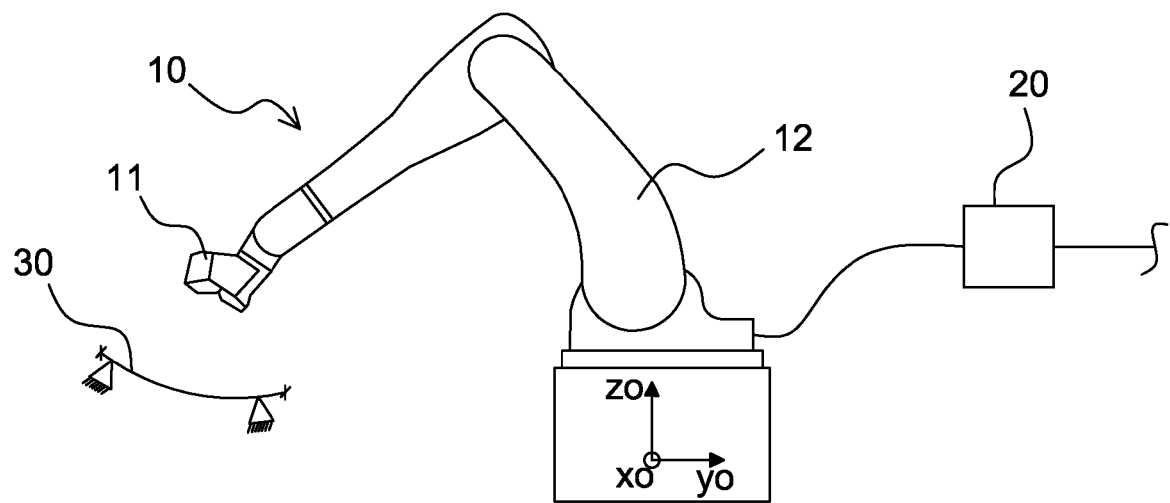
FIG. 1: a diagrammatic view of acquisition means of the measured geometry of an assembly surface of a part to be assembled.

In a nonlimiting embodiment shown diagrammatically in FIG. 1 the acquisition means 10 comprise a measuring device 11, for example of the contactless type, known in itself, mounted at the end of an articulated structure 12 able to move said measuring device 11. Said articulated structure 12 is intended to move the measuring device 11 in front of the whole of the assembly surfaces so as to acquire a complete measured geometry of those assembly surfaces.

The measurements may be made using any known device and method, by way of nonlimiting example by laser telemetry, optical projection of fringes (shearography), optical interferometry, a mechanical feeler.

In the nonlimiting embodiment represented diagrammatically in FIG. 1, the articulated structure 12 comprises an articulated arm. To this end, the articulated arm if necessary comprises drive means adapted to drive the measuring device 11 in rotation and in translation so as to provide the number of axes of mobility necessary for making the measurement.

A bearing structure such as an anthropometric robot as represented in FIG. 1 makes it possible to provide the measuring device with three axes of movement in translation and three rotation axes.

Thus it is possible to acquire the geometry of an assembly surface of a manufactured part, whatever its shape, by placing the measuring device 11 in an optimum position to make the necessary measurements.

In the embodiment illustrated by FIG. 1 the acquisition means 10 are represented in a position for measuring the measured geometry of an assembly surface 30 of one of the parts to be assembled. For the requirements of this measurement, each of the parts is preferably held in position at a measuring station that may also be an assembly station.

The geometry of the respective assembly surfaces of the two fabricated parts can be measured by the same acquisition means or by separate acquisition means. The latter alternative is of benefit, for example, in situations in which the measurements are made when the two parts are situated on two different production sites, so that the parts are measured at the end of a fabrication cycle and can be delivered with a file or a reference to a file accessible on a data server characterizing the geometry of the surface for the assembly operations.

The acquisition means 10 are connected to simulation means 20 sent data representative of the measured geometry of the assembly surfaces. This data representative of the measured geometry of the assembly surfaces represents a sampling of each of the assembly surfaces. These samplings of points have a resolution corresponding to the resolution at which the measuring device carried out the measurement, which resolution can if necessary be modified by interpolation if a different resolution proves preferable for carrying out the steps according to the geometry measurements.

The simulation means 20 are configured to simulate digitally the assembly of the parts in order to determine by calculation geometrical discrepancies 35 between the measured geometries of the assembly surfaces of each of the parts.

These differences mainly originate from dispersion in the fabrication of the parts to be assembled.

The simulation means 20 are configured to determine the shapes, dimensions and position of a "void" between the assembly surfaces resulting from these geometrical discrepancies 35 between the two parts. Depending in particular on the measured geometries of the assembly surfaces of the two parts to be assembled and their capacity for deformation during their assembly, this void may correspond to a plurality of distinct cavities separated by areas in which the assembly surfaces are in contact with one another. The remainder of the text refers to a single void resulting from the discrepancies, although that void may be divided into a plurality of distinct cavities.

It should be noted that the void is in practice relatively thin compared to the dimensions of the assembly surfaces, the variable thickness corresponding to the distance separating the facing points on the two surfaces when close together. It should be pointed out here that one objective of the invention is to correct dimensional imperfections associated with fabrication dispersion or minor deviations from the nominal dimensions of the parts.

According to one method of use, the samplings are interpreted by the simulation means 20 to form a digital model of the measured geometries of the assembly surfaces, for example in the form of clouds 31 and 32 of points. A cloud 31 or 32 of points is associated with each assembly surface, of which it constitutes a digital model, and is for example defined by the coordinates of the points of each cloud 31, 32 of points in a frame of reference Ra, Rb tied to the part of the cloud of points concerned.

The data representative of the measured geometry of each assembly surface advantageously comprises data corresponding to the position and/or the measured geometry of singular points of known identifiable structure, such as holes, edges, apexes, etc, or even reference elements positioned on the parts such as marks or targets, which are identified by the simulation means 20. This data corresponding to elements, points, lines, surfaces or volumes is used to define reference points 33 and 34, preferably known from the assembly specification, in order to simulate positioning of the clouds 31 and 32 of points prior to assembly by determining the positions of the clouds 31 and 32 of points relative to one another.

Figure 3:
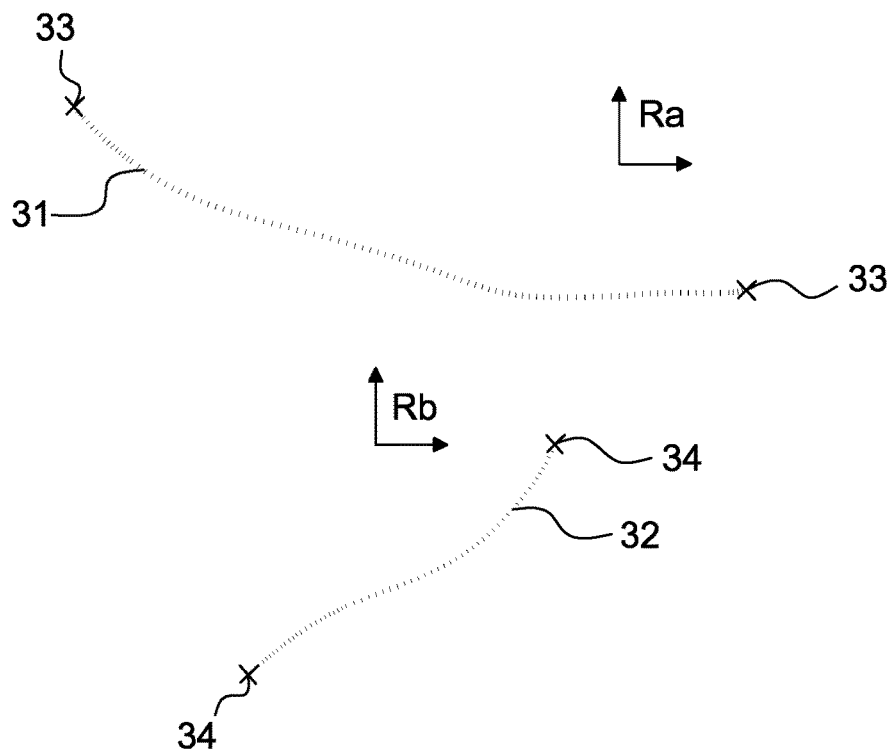
FIGS. 3 to 6: an illustration by means of an example of the successive operations of correction of the geometry differences between the two surfaces of the parts in the area in which the parts are brought into contact by the assembly process.
Figure 4:
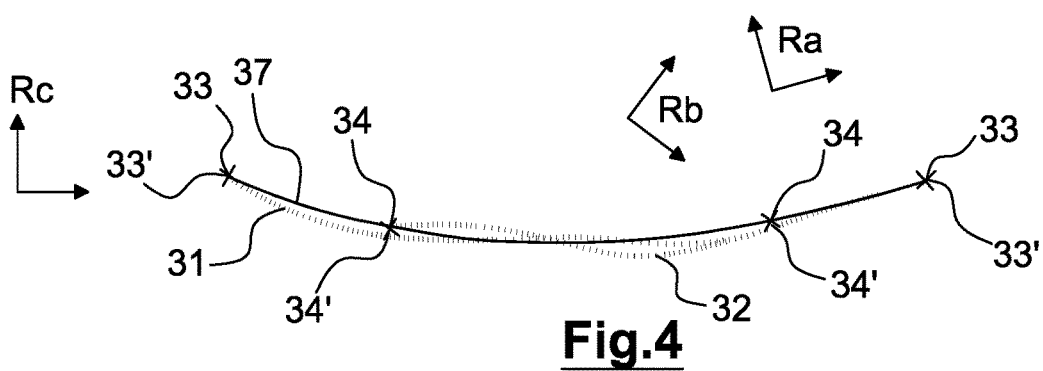

In the embodiment from FIGS. 3 and 4, each cloud 31 or 32 of points and therefore each simulated assembly surface is represented with two reference points 33 or 34. However, there is nothing to rule out each cloud 31 or 32 of points comprising more than or less than two reference points. Moreover, there is nothing to rule out the clouds 31 or 32 of points comprising different numbers of reference points.

The assembly may be simulated by applying position requirements between the respective reference points 33 and 34 of the clouds 31 and 32 of points in a manner analogous to the real positioning requirements of one part relative to the other, as defined by the assembly specifications of the parts. The assembly simulation is therefore representative of the assembly that must actually be carried out.

Figure 5:
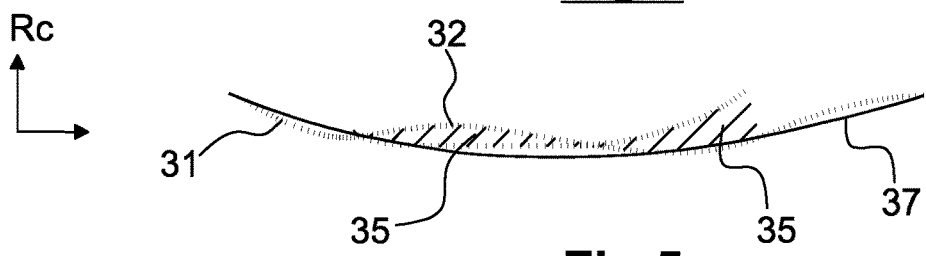

As FIGS. 4 and 5 show in an assembly simulation example, the simulation means 20 also know the definition of the nominal interface surface 37 defined in its own frame of reference Rc and representative of an assembly of parts with the nominal dimensions.

There is effected first, by simulation, an initial recalibration of the clouds 31, 32 of points by recalibration of the reference points on the nominal interface surface 37 (FIG. 4).

In the embodiment shown in FIG. 4, the relative position of the respective reference points 33, 34 of the clouds 31, 32 of points relative to one another is identical to the relative position of the reference points 33', 34' of the nominal interface surface 37. The clouds 31 and 32 of points are therefore positioned relative to one another so as to satisfy the position requirements defined by the assembly specifications.

Then at least one of the clouds of points corresponding to a surface is moved relative to the other cloud of points to simulate the contact without intersection of the two surfaces corresponding to said clouds of points (FIG. 5). The aim of this movement is a minimum offsetting of the reference points relative to the nominal surface, for example by proceeding for each reference point by a movement in a direction close to a direction orthogonal to an osculatory plane of the nominal surface at the reference point concerned and minimizing the amplitude of the movements of the reference points, for example by seeking a minimum value of the quadratic sum of the distances of the reference points of the surfaces that have been moved from the corresponding reference points of the nominal surface (FIG. 5).

It should be noted that, where appropriate, the simulated assembly surfaces are positioned taking account of the forces introduced on assembling the parts and which, within limits fixed by the assembly specifications, are liable to modify the geometry of the parts without those modifications being critical. The simulated surfaces will if necessary be simulated under mechanical loads, in particular when the technique of mechanical assembly of the parts will potentially generate mechanical stresses. The simulation means 20 are therefore adapted to simulate the assembly of the parts considering notably the deformation capacity of the materials from which they are made.

The position requirements as defined by the assembly specifications applied to the respective reference points 33 and 34 of the clouds 31 and 32 of points may be such that said clouds 31 and 32 of points are fixed relative to one another.

Alternatively, the position requirements applied to the respective reference points 33 and 34 of the clouds 31 and 32 of points can make possible relative movements between said clouds 31 and 32 of points if the parts to be assembled have one or more degrees of freedom for positioning them. The possibilities of relative movements of one cloud 31 or 32 of points relative to the other one make it possible to determine, within the possible limits, a position of the clouds 31 and 32 of points relative to one another in which the void resulting from the geometrical discrepancies 35 is preferably minimal.

Once the two simulated surfaces have been brought to bear on one another, the simulation means 20 determine by calculation on the basis of the resulting coordinates of the points of the sampling representing said simulated surfaces a thickness of the void resulting from the geometrical discrepancies 35 at any point of a meshing generated from the clouds 31 and 32 of points, the thickness being calculated for example in a direction orthogonal to an osculatory plane of the nominal interface surface 37 at the point concerned. Determining the value of the thickness of the void resulting from the geometrical discrepancies 35 at each point of the meshing makes it possible to define the shape, dimensions and position of said void, as shown by FIG. 5.

Figure 6:
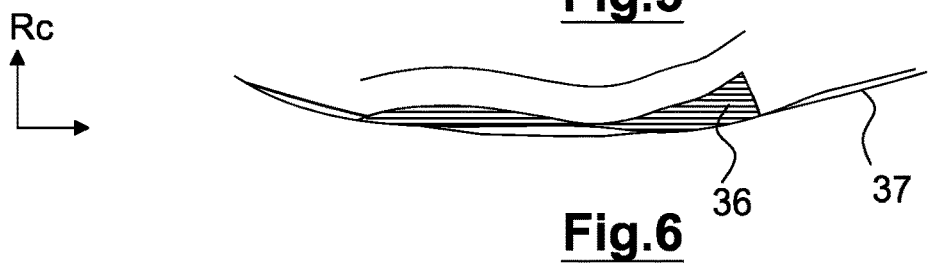

The simulation means 20 are adapted to generate a digital file in which the void resulting from the geometrical discrepancies 35 is discretized in superposed layers 36 as shown in FIG. 6.

These layers 36 are of predefined thickness, for example from 0.05 to 0.15 millimeters thick, but this thickness can be adapted as a function of the means employed to produce the layers of materials to be deposited and also a surface state that may result from this. Alternatively, the void resulting from the geometrical discrepancies 35 may be discretized in juxtaposed layers 36.

The simulation means 20 are configured to determine, following the assembly simulation, the relative position of the void resulting from the geometrical discrepancies 35 over one or the other or each measured assembly surface on the basis of the coordinates of said points in the frame of reference Rc and the position of the frame of reference Rc as a function of an absolute frame of reference tied to the nominal assembly surface.

The simulation means 20 comprise, for example, a computer adapted to carry out computation operations and to send data representative of the thickness of the void resulting from the geometrical discrepancies 35 at any point of the meshing on the basis of the digital file generated. The data notably includes data representative of the dimensions and the relative position of the void resulting from the discrepancies.

The corresponding calculation operations concern the manipulation of virtual objects in three dimensions. Software applications of this kind are widely known nowadays and employed for example in 3D modelers, synthesis imaging or three-dimensional computer-assisted design software. The person skilled in the art is in a position to configure such software to perform the calculations for the application of the invention.

The correction device also comprises additive fabrication means 40, for example a three-dimensional printing system, adapted to deposit material on at least one of the assembly surfaces of a part in order to fill at least partly and in a stable manner the void resulting from the geometrical discrepancies 35 between the measured geometries of the assembly surfaces. By "to fill at least partly" is meant that the material deposited, where applicable on the assembly surfaces of the two parts, must occupy the void resulting from the geometrical discrepancies 35 partly or completely.

Depositing material on the assembly surfaces of the two parts makes it possible, if these two operations of depositing material can be carried out simultaneously, to reduce the time taken to deposit the material and therefore to optimize the production time of the assembly. This solution may also be implemented when the geometry of one of the parts locally facilitates depositing material.

These additive fabrication means 40 are connected to the simulation means 20 and are configured to receive and interpret the digital file generated by said simulation means 20 following the assembly simulation.

The additive fabrication means 40 comprise a device 41 for depositing material fastened to a bearer structure 42 able to move said device 41 for depositing material in front of the void resulting from the geometrical discrepancies 35 to be corrected on an assembly surface.

The bearer structure 42 is adapted to move the device 41 for depositing material facing the whole of the surface of the measured geometry of the assembly surface. To this end said bearer structure 42 comprises drive means adapted to drive the device 41 for depositing material in rotation about three orthogonal axes, for example, and in translation along those three axes.

By way of nonlimiting example, the bearer structure 42 may be adapted to move the head 43 a few meters or tens of meters.

The bearer structure 42 may be disposed relative to the articulated structure 12 on the downstream side of a production line or on another production site.

Alternatively, the measuring device 11 and the device 41 for depositing material are mounted on the same bearer structure. Said bearer structure is then adapted to select the measuring device 11 or the device 41 for depositing material as a function of what is required. This feature is advantageous to the degree that the parts to be assembled may be immobilized on the same station as the operation of measuring the geometry of its assembly surface up to the operation of correcting the geometrical discrepancies 35, or even on an assembly station. The manipulation of the part is therefore reduced and the production time of the assembly optimized.

Figure 2:
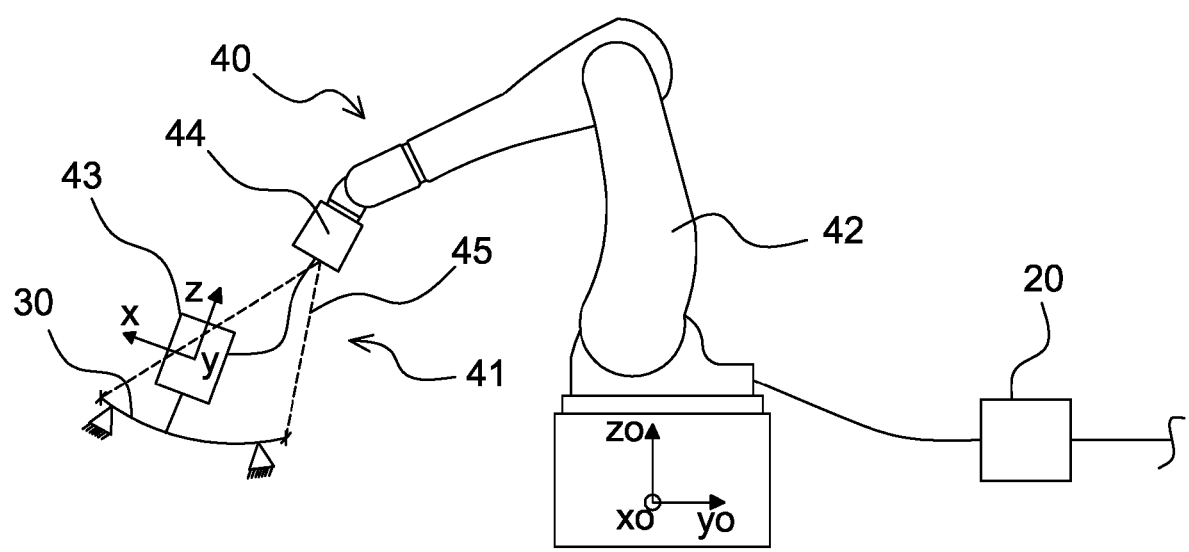
FIG. 2: a diagrammatic view of additive fabrication means and a part to be assembled.

In the nonlimiting embodiment represented diagrammatically in FIG. 2, the bearer structure 42 comprises an articulated arm.

However, in other embodiments that are not shown the bearer structure 42, by the same token as the articulated structure 12, may comprise any mechanical system, for example n anthropometric robot, a mobile gantry, a hexapod, etc., known to the person skilled in the art and adapted to move said device for depositing material to any point in space in a predefined area and with required orientations.

The device 41 for depositing material comprises a head 43 extending along a longitudinal axis and adapted to deliver material in a direction parallel to its longitudinal axis, for example. The material is intended to be deposited by the head 43 on the assembly surface 30 in the void resulting from the geometrical discrepancies 35 to be corrected, for example, in the form of a fusible wire that can be melted obtained from a reserve of material in wire or other form.

The material is chosen so that it favorably addresses a number of technical requirements, notably defined by the assembly specifications or by the use of the mechanical structure resulting from the assembly of the parts. These technical requirements may be characterized by a level of resistance to mechanical stresses, thermal or electrical conductivity, adhesion, heat resistance in operation, capacity to resist a chemical environment or the behavior of the material in contact with the material from which the parts are made, and generally speaking any stress to which the assembly may be subjected in use.

By way of nonlimiting example, the material or materials constituting the deposited material may be a polymer material, such as acrylonitrile butadiene styrene (ABS), or a metal, such as aluminum, and generally speaking any material that can be deposited and hardened on the surface of the part concerned by virtue of its physical-chemical characteristics, its preparation and its method of deposition.

The void resulting from the geometrical discrepancies 35 between the measured geometries of the assembly surfaces is preferably discretized so that the thickness of each layer 36 corresponds to the thickness deposited by each pass of the head 43.

The device for depositing material is configured to have a resolution and an accuracy appropriate for conforming to the assembly specifications.

The head 43 may be fastened to a support structure 44 mounted on the articulated arm in one nonlimiting embodiment shown in FIG. 2. The support structure includes drive means adapted to move said head 43 relative to the articulated arm. It is therefore possible, where the relative position is concerned, for limited movements requiring a positioning accuracy greater than the performance of the articulated arm used to move the head 43 over an assembly surface of all or part of the void resulting from the geometrical discrepancies 35 as a function of the compared dimensions of the movement capacities of the support structure and the void.

By way of nonlimiting example, the support structure 44 is configured to move the head 43 a few tens of centimeters.

The drive means of the support structure 44 are advantageously adapted to drive the head 43 in rotation about at least two non-parallel axes orthogonal to the longitudinal axis of the head 43. The head 43 is therefore able to adapt the direction in which it delivers the material so that it is normal to the assembly surface so that the material is deposited under optimum conditions to form layers of substantially constant thickness. The drive means of the support structure 44 are also adapted to drive the head 43 in translation along three mutually orthogonal axes, for example, so that the head 43 can be moved inside the void characterizing the geometrical discrepancies 35 to be corrected on an assembly surface, whatever the shape and the position in space of the measured geometry of said assembly surface.

In other embodiments of the invention, the head 43 may be mounted directly on the articulated arm and moved only by said articulated arm.

The device 41 for depositing material further comprises means 45 for controlling the head 43 adapted to acquire the position of the reference points 33 and 34 on the assembly surfaces in the absolute frame of reference so as to establish a reference system of axes and to actuate the respective drive means of the articulated arm and the support structure 44 in order to drive movement of the head 43. These drive means are actuated following the interpretation of at least one digital file generated by the simulation means 20. That digital file advantageously defines a strategy for filling the voids, and notably trajectories of the head 43 for depositing material determined during the assembly simulation. These trajectories aim at least partly to fill the void resulting from the geometrical discrepancies 35 at the interface of the measured geometries of the assembly surfaces by driving the head 43 for depositing material successively over at least a part of each layer 36. The position of the void resulting from the geometrical discrepancies 35 is expressed relative to the reference points 33 or 34.

Alternatively, in one nonlimiting embodiment, the relative position of the void resulting from the geometrical discrepancies 35 to be corrected on an assembly surface is determined in a system of coordinates tied to a reference frame of reference. This reference frame of reference is used thereafter by the device 41 for depositing material.

Material may advantageously be deposited on the assembly surface so as to respect the integrity and the geometrical tolerances of an existing hole, for example, necessary for a subsequent assembly step. If necessary, in order to comply with the geometrical tolerances of said hole, a step of reworking the hole to the final dimension is carried out.

The device is employed in a method of correction of the geometrical discrepancies 35 of the surfaces of parts to be assembled at the interface of the assembly.

The method includes:
- a step of measuring the geometry of an assembly surface of each part to be assembled,
- a step of simulation of the assembly of the parts on the basis of data representative of the measured geometry of the assembly surfaces during which geometrical discrepancies are determined by calculation for a sampling of points between the assembly surfaces at the interfaces of the two parts, from which geometrical discrepancies are determined characteristics of voids remaining between the assembly surfaces of the parts,
- a step, before the assembly of the parts, of depositing material on an assembly surface of at least one of the two parts so as at least partly to fill the voids between said surfaces resulting from the geometrical discrepancies when the parts are assembled.

Said steps are successive and carry out assembly in the above order.

The measurement step is carried out by the acquisition means 10. In this step, following the measurement of the geometry of an assembly surface of each part to be assembled, data representative of the measured geometry of the assembly surfaces of the parts comprising a sampling of each of those surfaces is sent to the simulation means 20 in order to carry out a step of simulation of the assembly of the parts.

This data is then interpreted by the simulation means 20, for example, as shown in one nonlimiting embodiment by FIG. 1, in the form of clouds 31 and 32 of points obtained from the measurement. A cloud 31 or 32 of points is associated with each measured geometry of an assembly surface and is for example included in its own frame of reference Ra or Rb to which are respectively tied the coordinates of the points of each cloud 31 or 32 of points. In each cloud 31 or 32 of points, reference points 33 or 34 of the parts are identified. These reference points make it possible to position the clouds 31 and 32 of points relative to one another in a similar manner to positioning the two parts to be assembled relative to one another, as defined by the assembly specifications of those parts.

The simulation means 20 may have a nominal interface surface 37 representative of an assembly of the parts with the nominal shapes and integrate said nominal surface 37 into a simulation of positioning the clouds 31 and 32 of points. The assembly of the parts to the nominal dimensions is simulated in its own frame of reference Rc associated with the nominal interface surface 37.

The nominal interface surface 37 comprises nominal reference points 33' and 34' respectively corresponding to the reference points 33 and 34 of the parts. With a view to positioning the clouds 31 and 32 of points relative to one another in a common frame of reference their respective reference points 33 and 34 are positioned in the frame of reference Rc on the reference points 33' and 34', respectively, as shown in FIG. 4.

The relative distance between the two clouds 31 and 32 of points anywhere in said clouds is then adjusted to simulate contact between the two simulated surfaces represented by said clouds 31 and 32 of points by bringing them to bear on one another, as shown in FIG. 5. To be more precise, the relative distance between the clouds 31 and 32 of points is adjusted so that the simulated assembly surfaces bear on one another without interpenetration of the parts so as to simulate assembly of the parts as defined by the assembly specifications.

The simulation means 20 then determine by calculation the value of the thickness of the void resulting from the geometrical discrepancies 35 relative to an osculatory plane of the nominal interface 37 at any point of a meshing generated from the clouds 31 and 32 of points.

The void resulting from the geometrical discrepancies 35 is then discretized into a predetermined number of layers 36 of material to be deposited so as to define in a generated digital file a strategy for filling those volumes.

The device 41 for depositing material carries out a step of depositing material on at least one of the two parts.

The device 41 for depositing material preferably deposits material on only one of the assembly surfaces. Alternatively, however, the device 41 for depositing material can deposit material on both assembly surfaces. Moreover, if the two parts to be assembled are not on the same production site, a second device for depositing material may deposit material on one of the parts.

The two parts comprising the assembly surfaces can then be assembled according to the assembly specifications. To this end, the assembly surfaces of each part are disposed face-to-face so that the void resulting from the geometrical discrepancies 35 between said assembly surfaces is at least partly filled.

This void is preferably completely filled following the assembly of the parts so that the two parts bear on one another at all points of their interface. Thanks to this feature, there is certain to be a reduction of the spaces that can remain empty between the parts as well as uniform contact between the parts. The result of this is for example facilitated assembly and better conditions for use of the fasteners or adhesives used for the assembly. The result of this is for example improved behavior of the structure resulting from the assembly of the parts vis a vis contact wear or corrosion under microdisplacements at the interface of the two parts.

More generally, note that the embodiments and applications considered above have been described by way of nonlimiting example and that other variants can therefore be envisaged.

In particular, the invention has been described considering an assembly of two parts at two assembly surfaces. However, there is nothing to rule out, in other examples, considering an assembly of more than two parts and/or more than two assembly surfaces.

The invention claimed is:

1. Method of correcting geometrical differences of surfaces of parts to be assembled at an interface of the assembly, comprising the steps of:
    measuring a geometry of an assembly surface of each part to be assembled;
    simulating an assembly of the parts in accordance with data representative of the measured geometries of the assembly surfaces to calculate geometrical discrepancies from a sampling of measurement points between the assembly surfaces at the interface of two parts and to determine characteristics of voids existing between the assembly surfaces of the two parts from the geometrical discrepancies;
    before the two parts are assembled, depositing a material on the assembly surface of at least one of the two parts to at least partly to fill the voids between the assembly surfaces resulting from the geometrical discrepancies for the two parts to be assembled; and
    wherein the simulation step comprises a step of simulating a contact of the two parts in accordance with the data representative of the measured geometries of the assembly surfaces, and wherein the simulation step accounts for deformations of the two parts by forces introduced by the contact of two parts during the assembly of the two parts.

2. The correction method according to claim 1, wherein the simulation step comprises a step of simulating a positioning of the two parts in accordance with the data representative of the measured geometries of the assembly surfaces, the data corresponds to the measured geometry of at least one known and identifiable singular point of a structure of each assembly surface to enable a determination of a position of simulated assembly surfaces relative to one another.

3. The correction method according to claim 2, wherein the simulation step comprises a step of simulating a contact of the two parts in accordance with the data representative of the measured geometries of the assembly surfaces, the contact is simulated between the simulated assembly surfaces by causing them to bear on one another without interpenetration of the two parts.

4. The correction method according to claim 1, wherein the simulation step comprises a step of discretizing the voids resulting from the geometrical discrepancies between the assembly surfaces of the two parts into a predetermined number of layers of material to be deposited.

* * * * *